(12) United States Patent
Plaisted et al.

(10) Patent No.: US 8,806,813 B2
(45) Date of Patent: Aug. 19, 2014

(54) TECHNIQUE FOR ELECTRICALLY BONDING SOLAR MODULES AND MOUNTING ASSEMBLIES

(75) Inventors: Joshua Reed Plaisted, Oakland, CA (US); Brian West, San Francisco, CA (US)

(73) Assignee: PVT Solar, Inc., Berkeley, CA (US)

( * ) Notice: Subject to any disclaimer, the term of this patent is extended or adjusted under 35 U.S.C. 154(b) by 825 days.

(21) Appl. No.: 11/848,766

(22) Filed: Aug. 31, 2007

(65) Prior Publication Data

US 2008/0053517 A1 Mar. 6, 2008

Related U.S. Application Data

(60) Provisional application No. 60/824,260, filed on Aug. 31, 2006.

(51) Int. Cl.

| | |
|---|---|
| *H01L 31/05* | (2014.01) |
| *H01L 31/048* | (2014.01) |
| *H01L 31/042* | (2014.01) |
| *H01R 4/64* | (2006.01) |
| *F24J 2/52* | (2006.01) |
| *H01R 4/66* | (2006.01) |
| *H01R 4/26* | (2006.01) |
| *F24J 2/46* | (2006.01) |

(52) U.S. Cl.
CPC .............. *H01L 31/0422* (2013.01); *H01R 4/64* (2013.01); *F24J 2/5207* (2013.01); *Y02E 10/47* (2013.01); *F24J 2/5258* (2013.01); *H01R 4/26* (2013.01); *F24J 2002/4665* (2013.01); *F24J 2/5211* (2013.01); *Y02B 10/12* (2013.01); *Y02E 10/50* (2013.01); *H01R 4/66* (2013.01)
USPC ........................... 52/173.3; 136/244; 136/251

(58) Field of Classification Search
USPC ................... 52/173.3; 136/244, 251; 439/927
See application file for complete search history.

(56) References Cited

U.S. PATENT DOCUMENTS

| 1,159,372 A | 10/1915 | Goff |
|---|---|---|
| 1,306,434 A | 6/1919 | Melanson |

(Continued)

FOREIGN PATENT DOCUMENTS

| DE | 19804685 A1 | 8/1999 |
|---|---|---|
| EP | 0417303 A1 | 3/1991 |

(Continued)

OTHER PUBLICATIONS

Communication Pursuant to Article 94(3) EPC in Application No. 06733720-4-1266, European Patent Office, Jul. 16, 2008, 6 pages.

(Continued)

*Primary Examiner* — Robert Canfield
(74) *Attorney, Agent, or Firm* — Armstrong Teasdale LLP

(57) ABSTRACT

A mounting system is provided for an array of solar modules. The mounting system includes one or more rail assemblies that extend lengthwise in a first direction to support a plurality of solar modules that comprise the array. Each of the one or more rail assemblies may be configured to compress in order to retain an edge section of one or more of the plurality of solar modules in an operable position. A conductive element may be positioned to bond the edge section of at least one of the plurality of solar modules with at least a section of the rail assembly that retains that edge section in the operable position, so as to form a conductive path for electrical current.

5 Claims, 9 Drawing Sheets

(56) References Cited

U.S. PATENT DOCUMENTS

| | | | |
|---|---|---|---|
| 2,747,166 A * | 5/1956 | Hoffarth | 439/884 |
| 3,881,799 A * | 5/1975 | Elliott et al. | 439/816 |
| 4,029,080 A | 6/1977 | Warren | |
| 4,061,413 A * | 12/1977 | Keller | 439/524 |
| 4,150,660 A | 4/1979 | Peters et al. | |
| 4,239,555 A * | 12/1980 | Scharlack et al. | 136/251 |
| 4,336,413 A | 6/1982 | Tourneux | |
| 4,372,292 A | 2/1983 | Ort | |
| 4,636,577 A | 1/1987 | Peterpaul | |
| 4,936,063 A | 6/1990 | Humphrey | |
| 4,961,712 A * | 10/1990 | Schwenk et al. | 439/436 |
| 4,993,959 A * | 2/1991 | Randolph | 439/92 |
| 5,180,442 A * | 1/1993 | Elias | 136/251 |
| 5,338,369 A | 8/1994 | Rawlings | |
| 5,409,549 A | 4/1995 | Mori | |
| 5,451,167 A * | 9/1995 | Zielinski et al. | 439/92 |
| 5,497,587 A | 3/1996 | Hirai et al. | |
| 5,524,401 A | 6/1996 | Ishikawa et al. | |
| 5,571,338 A * | 11/1996 | Kadonome et al. | 136/251 |
| 5,603,187 A | 2/1997 | Merrin et al. | |
| 5,687,453 A * | 11/1997 | Megregian et al. | 16/221 |
| 5,740,996 A | 4/1998 | Genschorek | |
| 5,788,204 A | 8/1998 | Goodwin et al. | |
| 5,851,309 A | 12/1998 | Kousa | |
| 5,924,486 A | 7/1999 | Ehlers et al. | |
| 5,986,203 A | 11/1999 | Hanoka et al. | |
| 6,106,310 A * | 8/2000 | Davis et al. | 439/95 |
| 6,195,066 B1 | 2/2001 | Pegues et al. | |
| 6,201,179 B1 | 3/2001 | Dalacu | |
| 6,269,596 B1 * | 8/2001 | Ohtsuka et al. | 52/173.3 |
| 6,283,770 B1 * | 9/2001 | Leung et al. | 439/92 |
| 6,320,120 B1 * | 11/2001 | Van Haaster | 174/369 |
| 6,323,478 B1 | 11/2001 | Fujisaki et al. | |
| 6,366,304 B1 * | 4/2002 | Nakayasu et al. | 347/129 |
| 6,465,724 B1 * | 10/2002 | Garvison et al. | 136/244 |
| 6,521,821 B2 | 2/2003 | Makita et al. | |
| 6,959,517 B2 | 11/2005 | Poddany et al. | |
| 7,012,188 B2 | 3/2006 | Erling | |
| 7,293,748 B1 | 11/2007 | Hoser | |
| 7,406,800 B2 | 8/2008 | Cinnamon et al. | |
| 7,419,377 B1 * | 9/2008 | Briere et al. | 439/32 |
| 7,469,508 B2 * | 12/2008 | Ceria | 52/173.3 |
| 7,592,537 B1 | 9/2009 | West | |
| 7,721,492 B2 | 5/2010 | Plaisted et al. | |
| 7,774,998 B2 | 8/2010 | Aschenbrenner | |
| 7,780,472 B2 * | 8/2010 | Lenox | 439/567 |
| 2002/0078991 A1 | 6/2002 | Nagao et al. | |
| 2003/0010372 A1 | 1/2003 | Dinwoodie | |
| 2003/0015637 A1 | 1/2003 | Liebendorfer | |
| 2003/0071177 A1 | 4/2003 | Aussiker | |
| 2003/0094193 A1 | 5/2003 | Mapes et al. | |
| 2003/0201009 A1 | 10/2003 | Nakajima et al. | |
| 2004/0011354 A1 | 1/2004 | Erling | |
| 2004/0163338 A1 | 8/2004 | Liebendorfer | |
| 2004/0187909 A1 | 9/2004 | Sato et al. | |
| 2005/0161074 A1 | 7/2005 | Garvison et al. | |
| 2005/0257453 A1 | 11/2005 | Cinnamon | |
| 2006/0032527 A1 | 2/2006 | Stevens et al. | |
| 2006/0042682 A1 | 3/2006 | Wolfe et al. | |
| 2006/0086382 A1 | 4/2006 | Plaisted | |
| 2006/0118163 A1 | 6/2006 | Plaisted | |
| 2006/0124167 A1 | 6/2006 | Fan et al. | |
| 2006/0225780 A1 | 10/2006 | Johnson, III et al. | |
| 2007/0251567 A1 | 11/2007 | Plaisted | |
| 2007/0295391 A1 * | 12/2007 | Lenox et al. | 136/251 |
| 2008/0053009 A1 | 3/2008 | Plaisted | |
| 2008/0121273 A1 | 5/2008 | Plaisted | |
| 2008/0169018 A1 * | 7/2008 | Miyamoto et al. | 136/251 |
| 2009/0019796 A1 | 1/2009 | Liebendorfer | |
| 2009/0038668 A1 | 2/2009 | Plaisted | |
| 2009/0165843 A1 | 7/2009 | Horioka et al. | |
| 2010/0018571 A1 | 1/2010 | Placer | |
| 2011/0005152 A1 | 1/2011 | Plaisted | |
| 2011/0100433 A1 * | 5/2011 | Jonczyk | 136/251 |
| 2011/0173900 A1 | 7/2011 | Plaisted et al. | |
| 2011/0174360 A1 | 7/2011 | Plaisted et al. | |
| 2011/0210085 A1 | 9/2011 | Plaisted | |

FOREIGN PATENT DOCUMENTS

| | | | |
|---|---|---|---|
| EP | 0587348 A2 | 3/1994 | |
| EP | 0599497 A1 | 6/1994 | |
| EP | 0614058 A2 | 9/1994 | |
| EP | 0905795 A2 | 3/1999 | |
| EP | 1873843 A2 | 1/2007 | |
| JP | 09-184209 A | 7/1997 | |
| JP | 10-159201 A | 6/1998 | |
| JP | 11-186586 | * | 7/1999 |
| JP | 11-204819 | * | 7/1999 |
| JP | 2000-100490 | * | 4/2000 |
| JP | 2001-214579 | * | 8/2001 |
| JP | 2001-262800 | * | 9/2001 |
| JP | 2004-251037 | * | 9/2004 |
| JP | 2005-194771 | * | 7/2005 |
| JP | 2007-262764 | * | 10/2007 |
| WO | WO 02/41407 A1 | 5/2002 | |

OTHER PUBLICATIONS

Final Office Action dated Jun. 10, 2009 in U.S. Appl. No. 11/851,299, 10 pages.
Final Office Action dated Oct. 6, 2008, in U.S. Appl. No. 10/855,254, 21 pgs.
Final Office Action dated Dec. 7, 2009 in U.S. Appl. No. 11/332,000, 11 pgs.
Final Office Action dated Dec. 4, 2009 in U.S. Appl. No. 10/855,254, 18 pgs.
International Preliminary Report on Patentability in International Application PCT/US2006/001593, World Intellectual Property Organization, Jul. 26, 2007, 11 pages.
International Preliminary Report on Patentability in International Application PCT/US2007/075531, World Intellectual Property Organization, Oct. 15, 2009, 8 pages.
International Search Report and Written Opinion of Sep. 30, 2009 10 pages.
International Search Report and Written Opinion of the International Searching Authority in International Application PCT/US2007/69304, World Intellectual Property Organization, Mar. 4, 2008, 12 pages.
International Search Report and Written Opinion of the International Searching Authority in International Application PCT/US2007/77433, World Intellectual Property Organization, Mar. 26, 2006, 10 pages.
International Search Report and Written Opinion of the International Searching Authority in International Application PCT/US2006/001593, World Intellectual Property Organization, Oct. 27, 2006, 19 pages.
Non-Final Office Action dated Jan. 24, 2008 in U.S. Appl. No. 10/855,254, 16 pgs.
Non-Final Office Action Dated Jun. 1, 2009 in U.S. Appl. No. 10/855,254, 17 pgs.
Non-Final Office Action dated Nov. 13, 2008 in U.S. Appl. No. 11/851,299, 9 pgs.
Non-Final Office Action dated Jan. 13, 2010 in U.S. Appl. No. 11/,947,658 pgs.
Non-Final Office Action dated Mar. 15, 2010 in U.S. Appl. No. 11/750,948; 13 pgs.
Non-Final Office Action dated Jun. 22, 2009 in U.S. Appl. No. 11/332,000, 13 pages.
Notice of Allowance dated Jan. 11, 2010 in U.S. Appl. No. 11/851,299; 8 pgs.
TELESTRUT Telescoping Strut; UNISTRUT; http://web.archive.org/web/20030202040614/http://www.unistrut.com/.
UNISTRUT Telespar Telescoping Tubing; UNISTRUT; http://web.archive.org/web/20030202040614/http://www.unistrut.com/.
U.S. Appl. No. 12/761,325, filed Apr. 15, 2010, Plaisted.
Communication Pursuant to Article 94(3) EPC in Application No. 06733720-4-1266, European Patent Office, May 25, 2010.

(56) References Cited

OTHER PUBLICATIONS

Non-Final Office Action dated Aug. 2, 2010 in U.S. Appl. No. 10/855,254; 28 pgs; Attorney Docket Kine.P101.
Notice of Allowance dated Jul. 12, 2010 in U.S. Appl. No. 11/947,658.
Notice of Allowance dated May 6, 2010 in U.S. Appl. No. 11/332,000.
Final Office Action dated Feb. 15, 2011 in U.S. Appl. No. 10/855,254.
Final Office Action dated Aug. 15, 2011 in U.S. Appl. No. 12/761,325,140.
Final Office Action dated Jul. 20, 2011 in U.S. Appl. No. 11/836,140.
Non-Final Office Action dated Apr. 15, 2011 in U.S. Appl. No. 12/949,551.
Non-Final Office Action dated Sep. 9, 2011 in U.S. Appl. No. 12/947,601.
Non-Final Office Action dated Jul. 22, 2011 in U.S. Appl. No. 13/042,266.
Non-Final Office Action dated Mar. 25, 2011 in U.S. Appl. No. 12/761,325.
Non-Final Office Action dated Nov. 9, 2010 in U.S. Appl. No. 11/836,140.
Notice of Allowance dated Sep. 30, 2010 in U.S. Appl. No. 11/750,948.
Notice of Allowance dated Sep. 27, 2010 in U.S. Appl. No. 11/332,000,

* cited by examiner

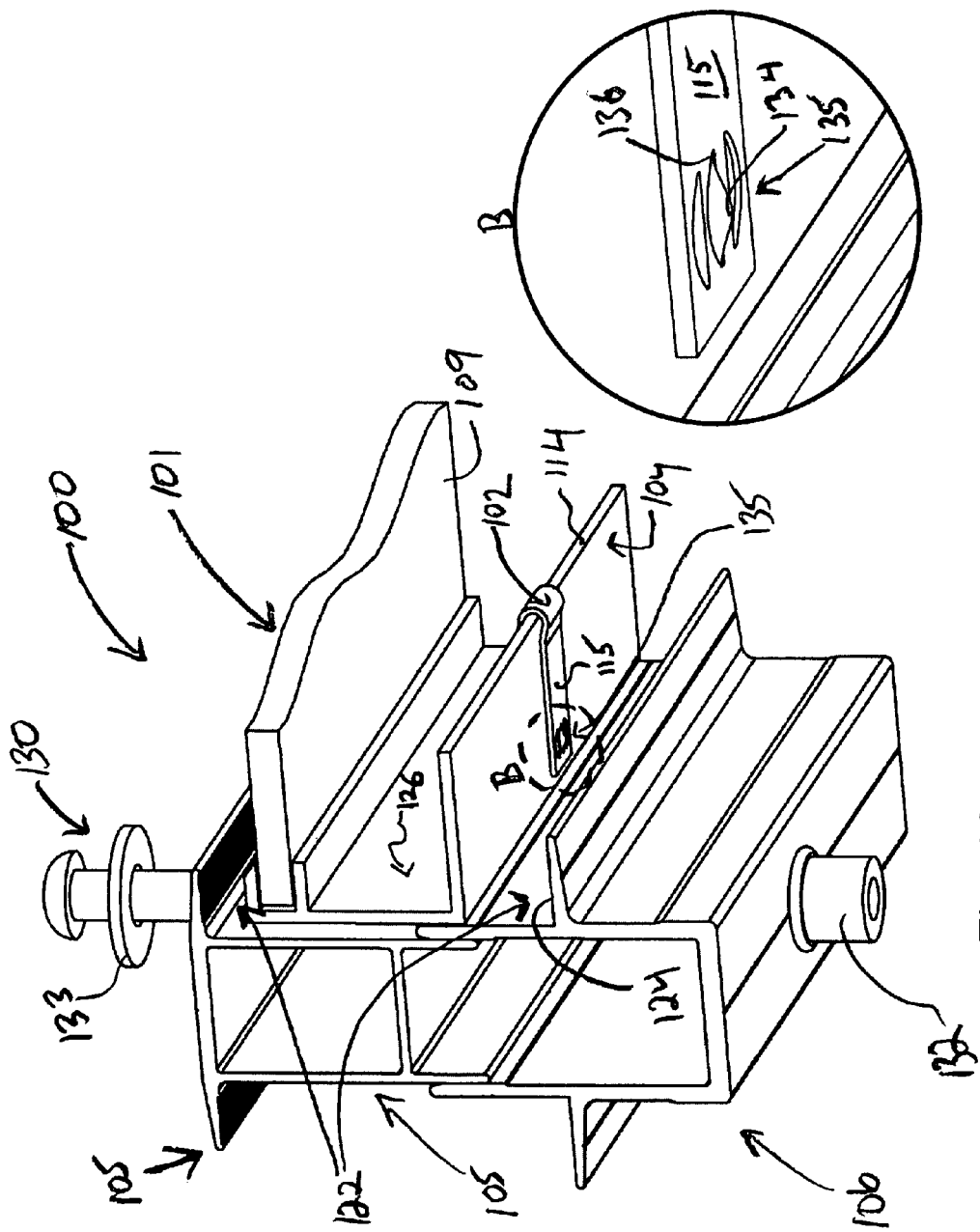

TECHNIQUE FOR ELECTRICALLY BONDING SOLAR MODULES AND MOUNTING ASSEMBLIES

RELATED APPLICATIONS

This application claims benefit of priority to Provisional U.S. Patent Application No. 60/824,260, filed Aug. 31, 2006, and entitled METHODS FOR GROUNDING SOLAR MODULES AND MOUNTING SYSTEMS. The aforementioned priority application is hereby incorporated by reference.

TECHNICAL FIELD

The disclosed embodiments relate generally to the field of solar modules and mounting systems. In particular, the disclosed embodiments relate to mechanisms for electrically bonding or grounding solar modules and mounting systems for solar modules.

BACKGROUND

Current methods of installing proper bonding devices for PhotoVoltaic (PV) modules and other types of solar modules is both expensive and time consuming. Most electrical codes require a grounding wire to be mechanically bonded to each PV module frame within an array of PV modules as well as to the overall mounting system itself.

There are two prevalent bonding methods that represent the state of the art. One uses an assembly of a screw and a custom washer to attach the grounding wire to the PV module such as illustrated in the installation manuals from many PV module manufacturers. Though a simple solution, it is time consuming to bond modules in this manner due to the need to wrap the grounding wire around each screw. Also, since the parts involved with this method are small and discrete, they are hard to handle and assemble on a rooftop during typical installations.

Another typical attachment method is to use a relatively expensive bonding lug such as those manufactured by Ilsco of Cincinnati Ohio. Although use of a bonding lug does not necessitate wrapping the grounding wire, the installation is also labor intensive and awkward because of its two-step process: first the lug has to be fastened to the frame of the PV module and then the wire must be clamped into the lug using a second fastener such as a set screw.

BRIEF DESCRIPTION

FIG. 1A illustrates a rail assembly for use as part of a larger solar module mounting assembly, according to an embodiment of the invention.

FIG. 1B is a close-up of a portion of the conductive element of FIG. 1A, under an embodiment of the invention.

DETAILED DESCRIPTION

Figure 2A:
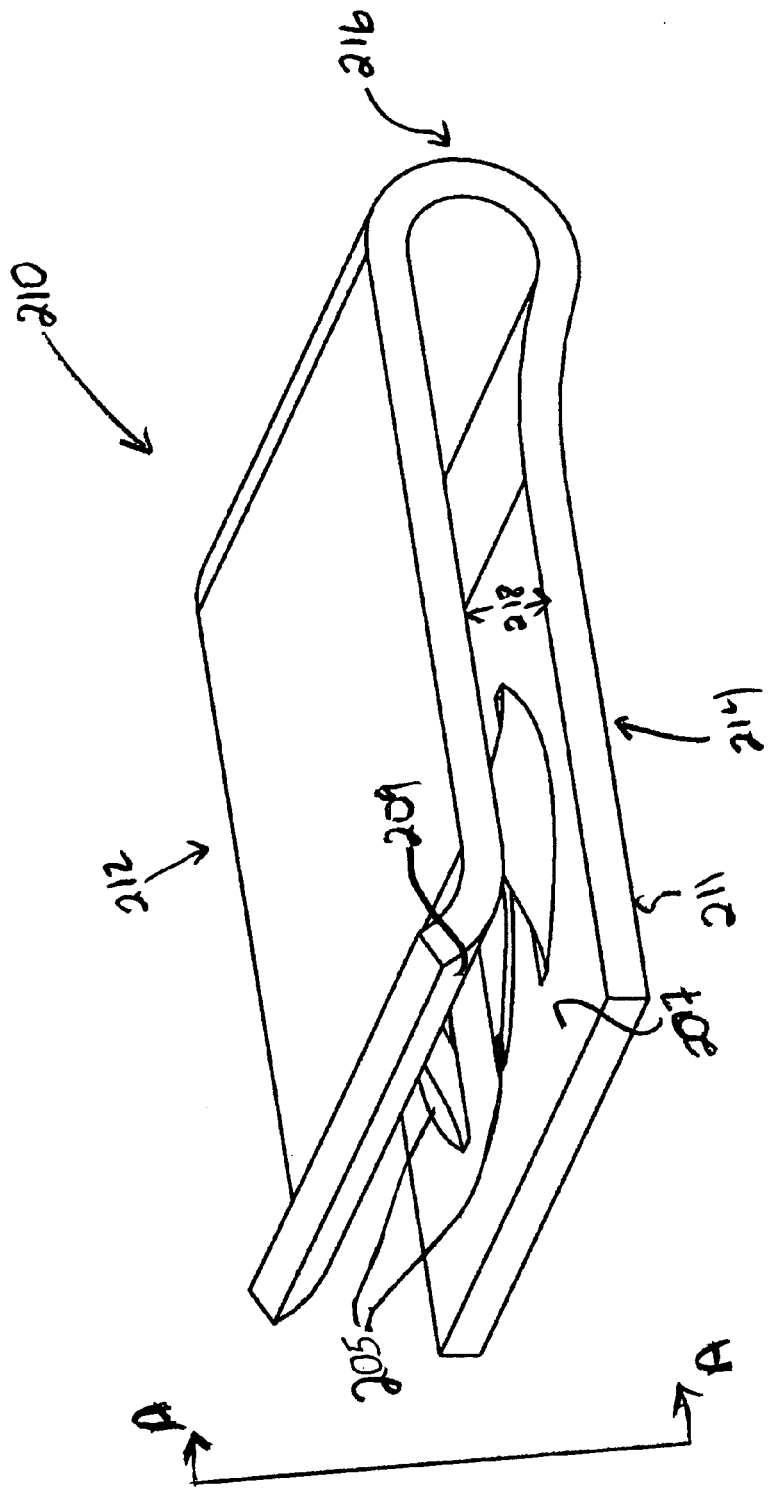
FIG. 2A illustrates a bonding clip for use as a conductive element, in accordance with an embodiment of the invention.

Embodiments described herein enable use of conductive elements on mounting assemblies for solar modules, for purpose of creating bonding or grounding points. As described, embodiments provide that such conductive elements are included between the engagement of the solar modules and the rail assemblies or support structures that hold the solar modules in place. Conductive paths for bonding or grounding purposes may then be formed that require minimal additional steps in assembling the mounting assembly as a whole. One or more embodiments enable such bonding or grounding features to be incorporated into the solar module array with assembly steps that eliminate the need for running grounding/bonding elements as separate assembly requirements.

According to an embodiment, a mounting system is provided for an array of solar modules. The mounting system includes one or more rail assemblies that extend lengthwise in a first direction to support a plurality of solar modules that comprise the array. Each of the one or more rail assemblies may be configured to compress in order to retain an edge section of one or more of the plurality of solar modules in an operable position. A conductive element may be positioned to bond the edge section of at least one of the plurality of solar modules with at least a section of the rail assembly that retains that edge section in the operable position, so as to form a conductive path for electrical current. The conductive paths may extend from the edge section to at least the one or more rail assemblies.

Although numerous embodiments described herein are described in the context of a particular style of a Common Compressed Rail (CCR) mounting system, embodiments described herein may be implemented with other structures and mounting systems. In particular, embodiments described herein apply across an entire range of similar mounting systems. A particular benefit of combining embodiments such as described herein with CCR systems is that the upper and lower mounting rails may share a common edge with the solar module frames. Therefore, if bonding features of any kind are provided at regular intervals, it will be guaranteed that the solar module frame and mounting rail will be mating surfaces.

FIG. 1A illustrates a rail assembly for use as part of a larger solar module mounting assembly, according to an embodiment of the invention. As will be described, conductive elements may be included or used with a rail assembly 100 to enable the passage of electrical current between one or more solar module frames and the mounting system. Enabling the passage of electrical currents in a manner provided for by embodiments described herein enables a mounting assembly or system to handle, for example, electrical shorts on individual solar modules, lightening strikes, or other events which can be dangerous or harmful to equipment.

With reference to embodiments described herein, a mounting assembly generally includes solar modules, rail assemblies, and strut runners. The solar modules include a combination of a solar panel and a frame that holds the solar panel. The panel itself may include solar cells or other solar-sensitive material such as a thermal absorber. The rail assemblies provide a primary support for retaining solar modules in position. U.S. patent application Ser. Nos. 10/855,254 11/332,000 (both of which are hereby incorporated by reference in their respective entirety) for example, illustrate the use and context of a rail assembly for use in retaining and supporting solar modules in operable positions to receive sunlight. Generally, the strut runners interconnect the rail assemblies and provide support for the rail assemblies by securing the rail assemblies to an underlying structure (such as a roof top).

According to an embodiment, the rail assembly 100 is structured to retain a solar module in an operable position (i.e. directed to receive sunlight). The solar module 101 includes a frame 104 and a panel 109 having solar sensitive materials. The rail assembly 100 includes a top rail section 105 and a bottom rail section 106 that combine to form a receiving structure 122. In order to support the solar module 101, the top and bottom rail sections 105, 106 are compressed while an edge section 126 of the frame 104 of the solar module 101 is inserted or retained with the receiving structure 122. The receiving structure 122 may include a ledge surface 124, which in an embodiment shown is provided by the bottom rail section 106. Absent intermediate structures described herein, the top rails section 105 is compressed into the bottom rail section 106 to tighten a dimension of the receiving structure 122, and cause the receiving structure 122 to grip the frame 104 against the ledge surface 124.

A conductive element 102 is positioned between the frame 104 and the rail assembly 100. In one embodiment, the conductive element 102 is sandwiched between the frame and the ledge surface 124, where the active compression force for compressing the top and bottom rail structures 105, 106 is in effect. In an embodiment, the conductive element 102 is provided as a thickness over the ledge surface 124 (to be between the frame 104 and the ledge surface 124). In one embodiment, the conductive element 102 is a clip extending on an underside of the frame 104. The clip formation of conductive element 102 may enable it to grip with bias an edge 114 of the frame 104. A strip 115 may extend underneath the frame 104, so as to be positioned over the ledge surface 124. A protrusion 135 may be positioned on the strip 115 so as to be in contact with the ledge surface 124 when the top and bottom rail sections 105, 106 are under compression.

To provide compression, one or more embodiments provide for a compression bolt 130 that interconnects (with compression) the top and bottom rail sections 105, 106. A structure 132 may receive the bolt 130. Under one implementation, the receiving structure 132 is in the form of a captive nut formed from metal such as steel. A washer 133 may be used under the bolt 130 to spread the compressive force. The washer 133 may be serrated to promote electrical bonding between the bolt 130 and the top rail structure 105. The receiving structure 132 may take several forms, including the form of a threaded insert. Alternatively, structure 132 may be formed directly on the bottom rail structure 106 through a drilling and tapping process such that it is electrically bonded to the lower mounting rail 106.

When tightened, compression is applied through bolt 130 and receiving structure 132. The compression may act to reduce a dimension of the receiving structure 122, thereby forcing the frame 104 against the ledge surface 124. The conductive element 102 is compressed between the frame 104 and the ledge surface 124, with the protrusion 135 being bonded with the ledge surface 124.

A resulting conductive path is provided from the frame 104 to the rail assembly 100 to enable passage of electrical current for bonding the frame to the rail assembly. As will be described, the rail assembly 100 may be interconnected to other components to enable grounding of the elements within the solar array.

FIG. 1B illustrates that the thickness of the conductive element may have varying dimensions when provided on the ledge surface 124. According to an embodiment, the thickness, shown in the form of protrusion 135, includes a peak 134 and a trough 136 (thus defining one or more peaks). One embodiment provides that at minimum, the peak 134 and trough 136 may be visually distinguishable, so as to be vertically separated by a distance that is greater than 1 mm.

FIG. 2A illustrates a bonding clip 210 for use as a conductive element, in accordance with an embodiment of the invention. The bonding clip 210 may include multiple bonding features 205 designed to enable or enhance electrical contact between an underside of the frame 104 (FIG. 1A) and the ledge surface 124 (FIG. 1A). In an embodiment, the clip 210 includes a first panel 212 that is joined with a second panel 214 via a radius bend 216. A gap 218 is defined in the structure for gripping the edge of the frame 104. The radius bend 216 enables the panels 212, 214 to be biasely separated, so as to increase a dimension of the gap 218. The dimension of the gap 218 may be designed so that when the clip 210 is in an unbiased state, the gap 218 is less than a dimension of the thickness of the edge 114. The clip 210 can be biasely enlarged to positively grip the edge 114 of frame 104 and remain in position.

To provide a secure electrical bond with the frame 104 (FIG. 1A), bonding features 205 may be in the form of teeth or protrusions that grip into one of the surfaces of the frame. The bonding features 205 may be provided on one or both inner surfaces 207, 209 provided by panels 212, 214. One of the exterior surfaces 211 may also include bonding features 215 (shown in FIG. 2B) to bond with the ledge surface 124 of the receiving structure 122.

Figure 2B:
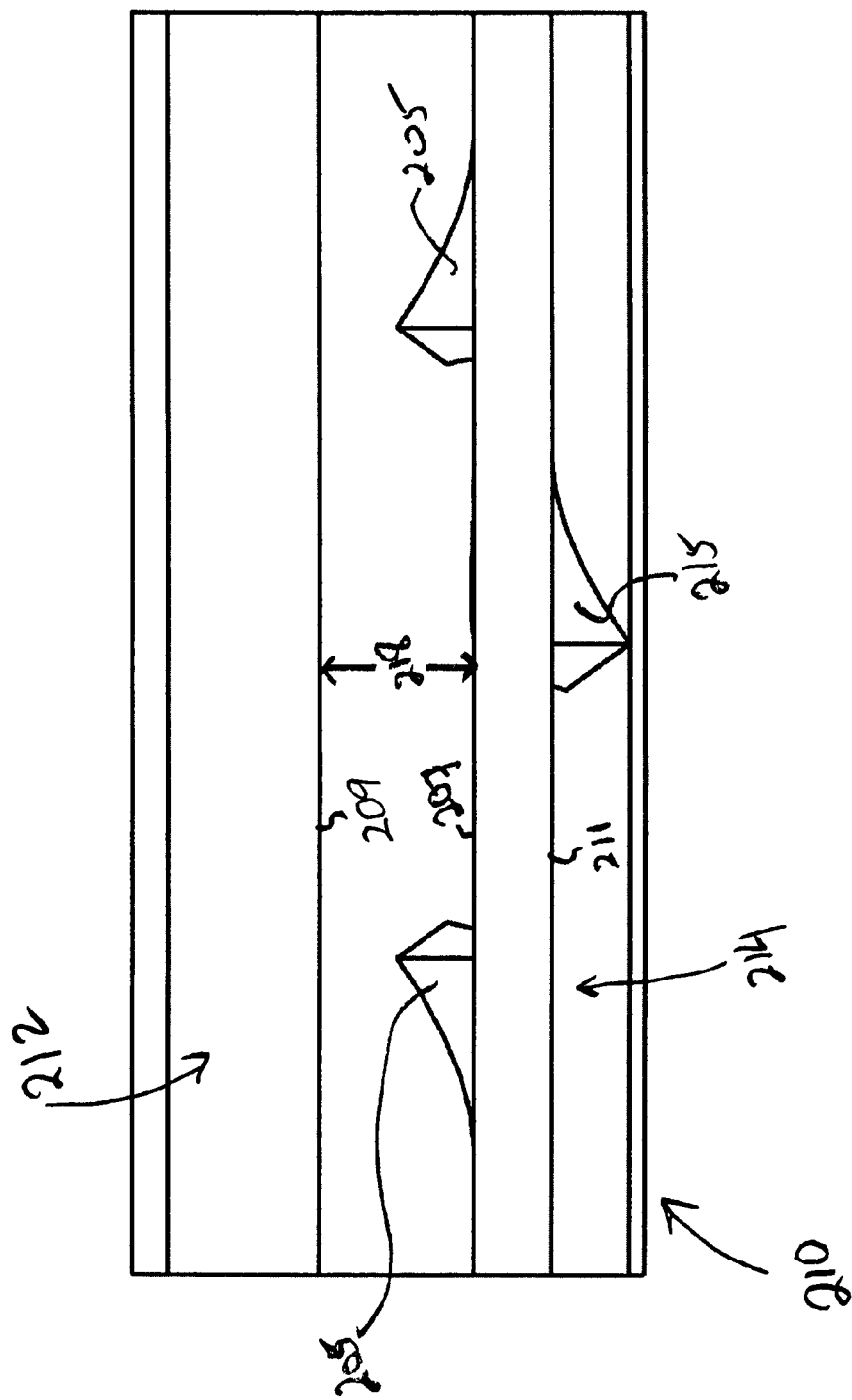
FIG. 2B is a frontal view of clip of FIG. 2A, along lines A-A, under an embodiment of the invention.

FIG. 2B is a frontal view of clip 210, along lines A-A, under an embodiment of the invention. As shown, bonding features 205 may be provided on an interior surface 207 that partially defines gap 218 along with interior surface 209. The panels 212, 214 may biasely separate to increase dimension of gap 218, enabling the edge 114 of frame 104 to be inserted therein. A lower bonding feature 215 is extended from clip 210. In an embodiment such as shown by FIG. 1A, the lower bonding features 215 bonds to the ledge surface 124. Under one embodiment, the lower bonding features 215 is also sharpened to tooth-shaped to enhance the bond under compression. Sharpened features such as shown by bonding features 205, 215 also provide added benefit of penetrating through any coated surface that may be provided on either the frame 104 or ledge surface 124, including paint, anodization, or corrosion.

In FIGS. 2A and 2B, bonding features 205, 215 may be formed during the die stamping process used to fabricate the clip 210. Other implementations of the protrusions are also possible and may range from raised and pointed cones to the sharp open barbs found on fine grating devices. Alternately, the bonding features 205, 215 may be formed such that an enclosed contact area is formed to specifically exclude introduction of air or moisture that could oxidize the contact area and inhibit the electrical bond. One purpose of the bonding features 205, 215 includes penetration of any coatings on the mating surfaces to provide good and constant electrical contact between the frame 104 and the rail assembly 100 (or other portion of a larger mounting assembly). This can be achieved though a multitude of features and should not be restricted to those outlined above.

According to an embodiment, clip 210 may serve an additional purpose of retaining any wiring in the solar array, such as interconnections between solar PV modules. The use of such a feature hides the wires from view for a more aesthetically pleasing array and may prevent the wires from abrading over time due to the wind brushing the wires against a roof or the mounting system itself.

Figure 2C:
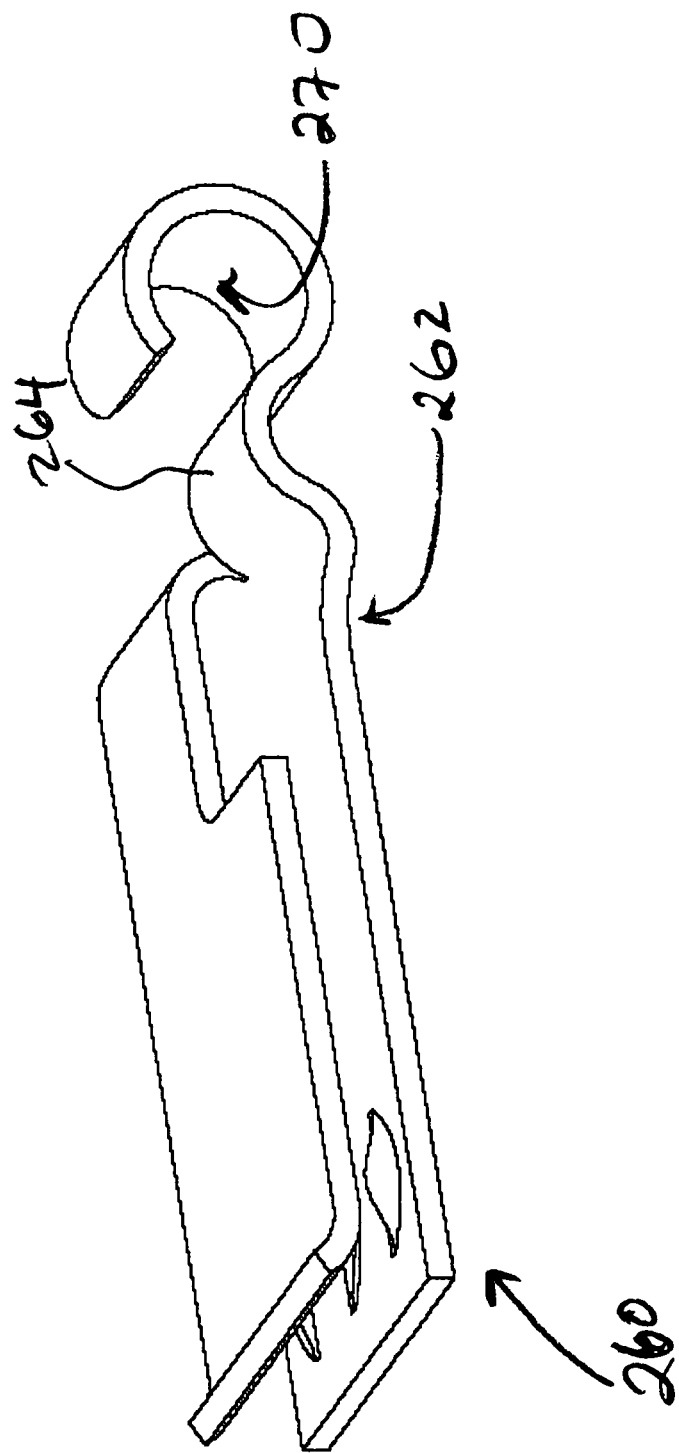
FIG. 2C illustrates an embodiment in which an alternative clip is provided, according to an embodiment of the invention.

FIG. 2C illustrates an embodiment in which an alternative clip 260 is shaped to contain a wire-holding loop 270. The wire-holing loop may be configured to retain any wiring within the solar array. In this configuration, the remotely located wire-holding loop 270 is separated from a main body 262 of the clip 260 by a bridge 264, which allows any wires to be inserted after the bonding clip 260 has been installed.

While embodiments described herein reference conductive element 102, (FIG. 1A) in the form of one of the clip 210 (FIG. 2A) or clip 260 (FIG. 2C), being provided for ledge surface 124, embodiments provide for other variations and implementations. Among the variations, rail assembly 100 may not require a ledge surface 124, but rather may compress the frame 104 using other features of the receiving structure 122. Thus, for example, any of the conductive elements (including clips 210, 26) described above may be provided for the frame 104 compressing against some other structure of the top or bottom rail section 105, 106 or receiving structure 122. In one implementation, the frame 104 may include only vertical flanges as opposed to edge 114, in which case the conductive element (or one of the clips 210, 260) may be relocated for intimate contact during the compression.

As an example, one possible arrangement includes placing alternative bonding features on radius bend 216 of the clip 210, so that when the clip is installed on a vertically aligned flange, the alternative bonding features are forced into contact with a surface of the bottom rail section 106 (FIG. 1A). Alternately, a clip may be positioned between the frame 104 and the top rail section 105 to provide electrical contact.

As mentioned, strut runners may form part of an overall mounting assembly that interconnects rail assemblies and secures rail assemblies to a rooftop or other underlying structure. One or more embodiments provide for use of strut runners to provide grounding or other forms of electrical bonding, in connection with bonding features described with other embodiments. The use of strut runners enables, for example, electrical current caused from a shorted PV module or a lightening strike to be grounded or carried away from the mounting structure.

Both the top rail section 105 (FIG. 1A) and bottom rail section 106 (FIG. 1A) may be formed from extruded Aluminum, formed steel, or other electrically conducting material of sufficient cross section to act as electrical buss-bars. Such construction enables the formation of an electrical bond between separate solar modules arranged along their length. Moreover, the use of bolt 130 to attain compression of the top and bottom rail sections 105,106 for each of multiple solar modules 101 in a column may be leveraged. More specifically, the column arrangement provides for multiple bolts 130 to also be aligned vertically with the rail sections. The bolts 130 may provide electrical continuity between the top rail section 105 and bottom rail section 106, so as to properly bond the entire mounting system and thus allowing current to freely pass between all members. This same regular pattern of bolts 130 assures sufficient pressure upon the solar module frames to compress the conductive elements 102 (FIG. 1A), which as described with FIG. 2A and FIG. 2C, may correspond to clips 210 or clips 260.

Figure 3:
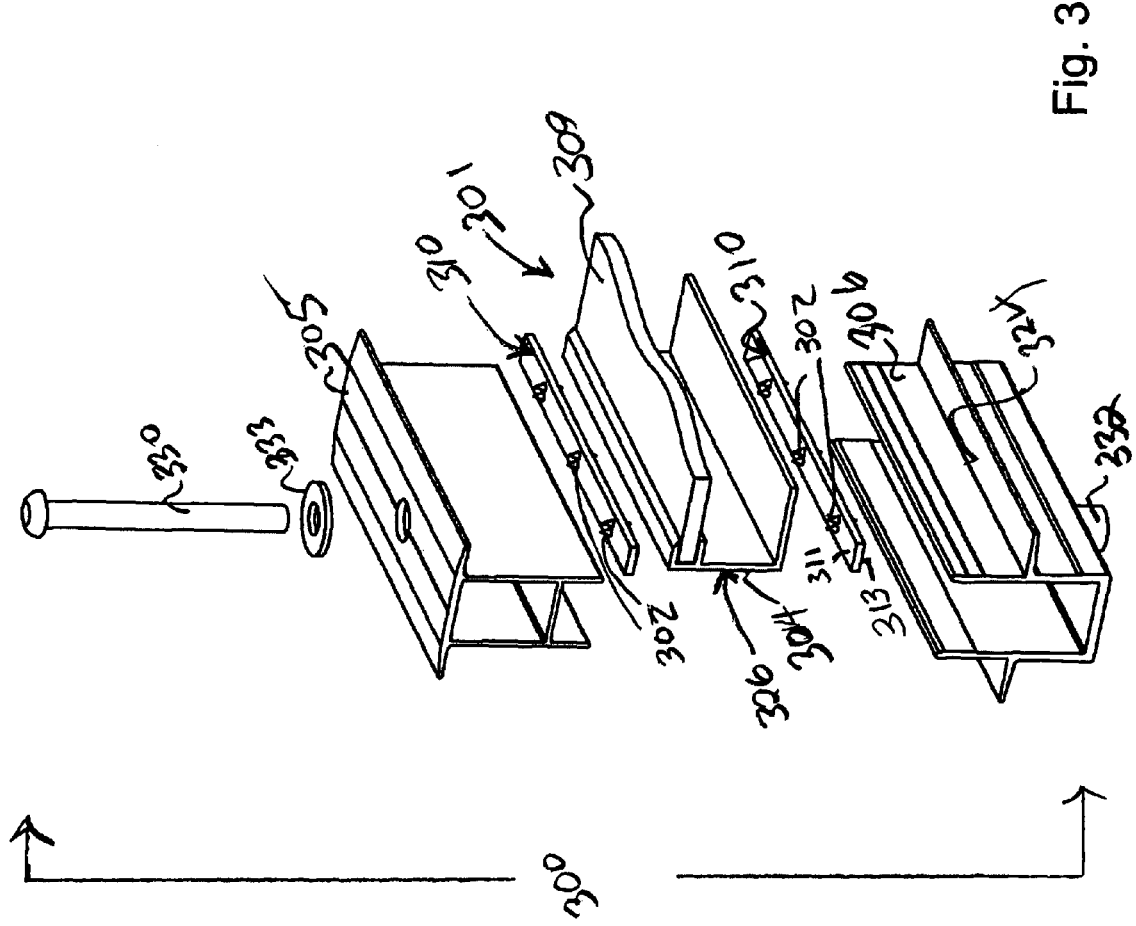
FIG. 3 is an exploded side view of a rail assembly configured to include one or more bonding features, under another embodiment of the invention.

FIG. 3 is an exploded side view of a rail assembly configured to include one or more bonding features, under another embodiment of the invention. In FIG. 3, rail structure 300 may, as described with an embodiment of FIG. 1A, include a top rail section 305 that compresses against a bottom rail section 306. The combined rail sections 305, 306 may form the receiving structure that includes the ledge surface 324. In one embodiment, the compression mechanism is provided by the bolt 330, which secures into receiving structure 332. Washer 333 may be used under bolt 330 to spread the compressive force. When the top and bottom rail sections 305, 306 compress, they retain an edge section 326 of the solar module 301, so that the solar panel 309 is in an operable position (i.e. to receive sunlight).

As further described with an embodiment of FIG. 1A, one or more embodiments provide for use of conductive elements 302 to electrically bond the frame 304 of the solar module 301 and the rail assembly 300. In an embodiment of FIG. 3, the conductive elements 302 are in the form of a strip 310.

FIG. 3 illustrates another rail assembly configuration for promoting electrical bonding in a mounting system, under an embodiment of the invention. As described, an embodiment of FIG. 3 provides for use of a bonding strip 310 to electrically bond (and protect) a mounting assembly. In an embodiment, the bonding strip 310 is a thickness of material that is placed between the solar module frame 304 and the top and bottom rails structures 305, 306. In one implementation, the bonding strip 310 may contain multiple sharp protrusions 302 on both a top and bottom surface 311, 313. These protrusions 302 may penetrate the surfaces of the solar module frame 304 and corresponding top or bottom rail sections 305,306. When the rail sections 305,306 are compressed, the sharp protrusions 302 penetrate any coatings on the solar module frame 304, as well as on the particular top or bottom rail section 305,306 that is contact. The result is the establishment of a secure electrical bond for the passage of electrical current.

Although the bonding strip 310 is shown placed on both sides of the solar module frame 304, an alternative embodiment may employ only a single bonding strip 310. For example, the bonding strip 310 may be employed on just the bottom rail section 306, or just the top rail section 305.

The bonding strip 310 may be formed through any one of many possible processes. One possible process includes using a die punch or to roll form a metal strip that integrally forms the protrusions 302 in forms analogous to those used in the bonding clip of FIGS. 2A-2C. Alternately, conductive studs could be embedded into a polymer or rubber strip wherein the studs protrude from both sides of the bonding strip 310. In such a case, only the studs need to be conductive and the strip itself is just a carrier that can be made from conductive or non-conductive materials. Another possible process is to utilize commercially available contact strips such as the MULTILAM product series manufactured by MULTI-CONTACT of Santa Rosa, Calif. among others.

Figure 4:
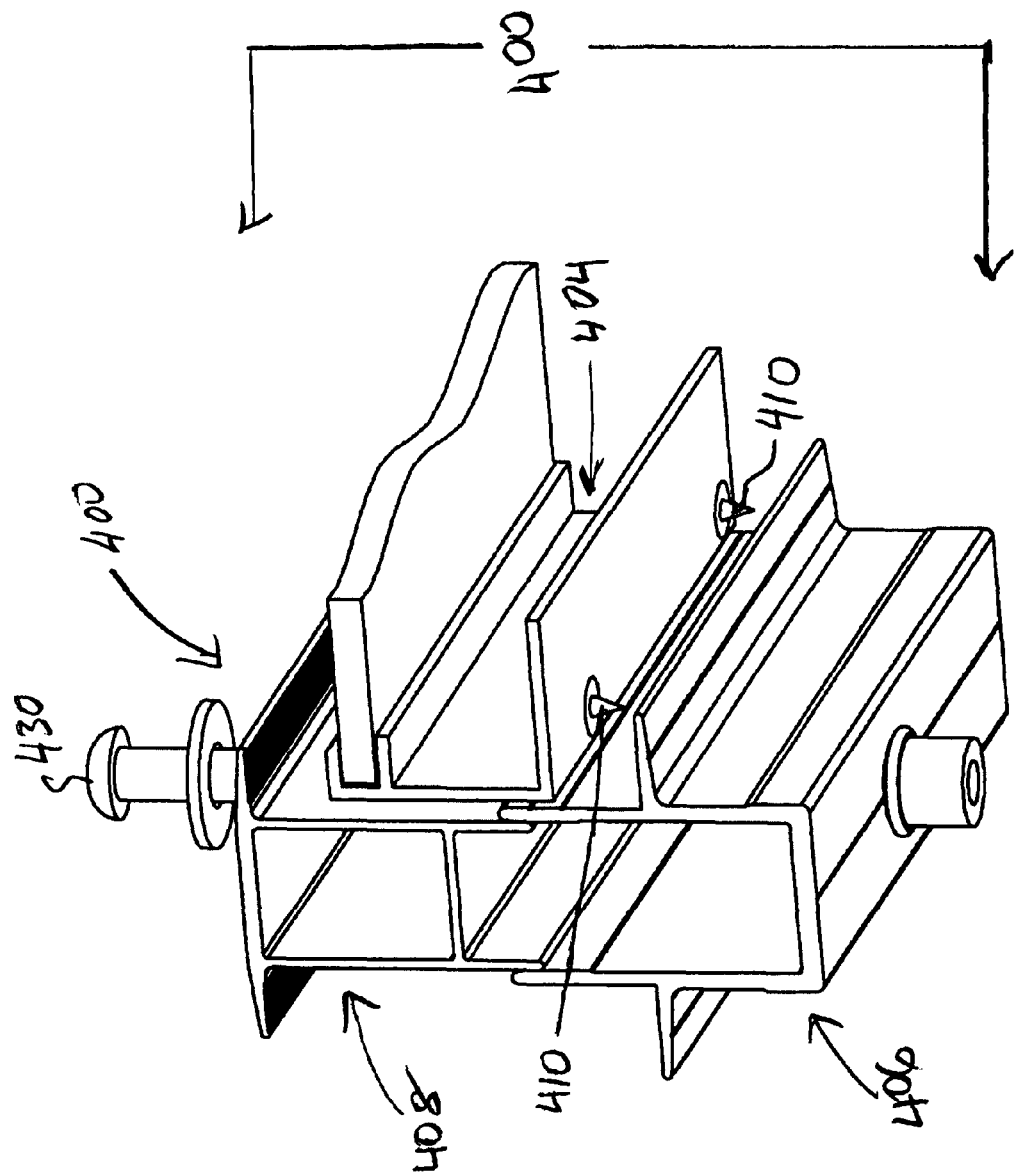
FIG. 4 illustrates another rail assembly configuration for promoting electrical bonding in a mounting system, under an embodiment of the invention.

FIG. 4 illustrates another rail assembly configuration for promoting electrical bonding in a mounting system, under an embodiment of the invention. As described, an embodiment of FIG. 4 provides for use of discrete bonding pins 410 instead of, for example, the strip 310. For simplicity, the rail assembly 400 is shown to have a construction described with an embodiment of FIG. 1A or FIG. 3. According to one embodiment, the bonding pins 410 include conductive points that are fastened to the solar module frame 404, or alternatively to the top and bottom rail sections 405, 406. When the top and bottom rail sections 405, 406 are compressed by the bolt 430, the bonding pins 410 penetrate into the solar module frame 404 and/or top and bottom rail sections 405, 406. In one implementation, the bonding pins 410 are in the form of barbed or press fitted metal studs that provide intimate electrical contact. In alternative implementations, for example, the bonding pins may take the form of blind rivets wherein the rivet head is barbed or otherwise enhanced to provide contact and pierce insulators on the opposed mounting surface.

Figure 5:
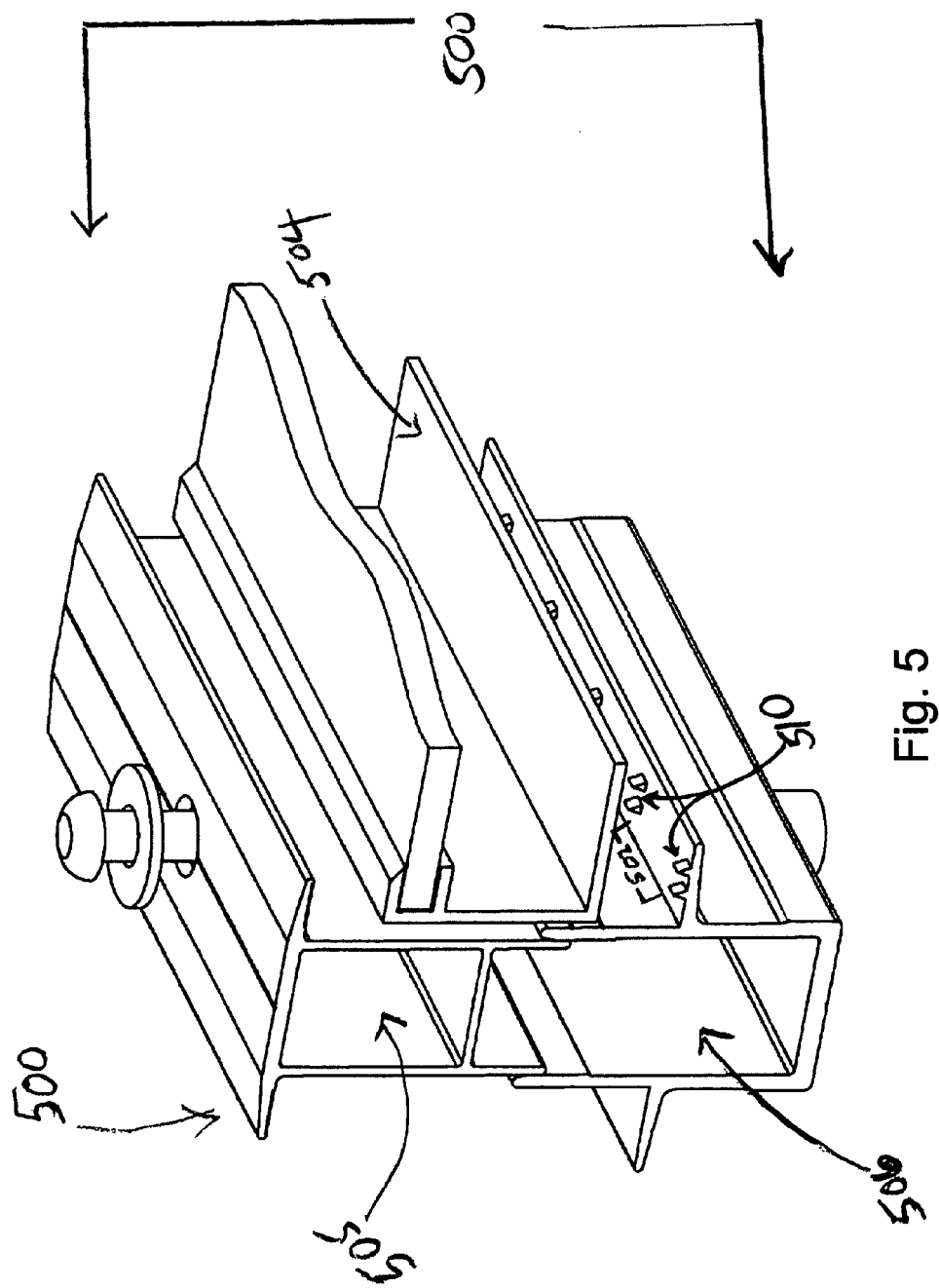
FIG. 5 illustrates another rail assembly configuration for promoting electrical bonding in a mounting system, under an embodiment of the invention.

FIG. 5 illustrates another rail assembly configuration for promoting electrical bonding in a mounting system, under an embodiment of the invention. As described, an embodiment of FIG. 5 provides for use of sharp internal bonding features 510, instead of, for example, the discrete bonding pins 410 (FIG. 4) or the strip 310 (FIG. 3). For simplicity, the rail assembly 500 is shown to have a construction described with other embodiments provided for herein.

In one embodiment, the sharp internal bonding feature 510 may be provided to be integral to the cross-section of the bottom rail section 506, regardless of whether the rails have been extruded, rolled, or formed by other means. Such bonding features 510 may be designed to penetrate into the solar module frame 504 when the mounting system is compressed. The bonding features 510 may be made continuous, as through an extrusion or rolling process. As an alternative or addition, the bonding features are enhanced by a secondary machining or grinding process that removes material to yield intermediate gaps 502 and thereby create the discrete bonding features 510 illustrated in FIG. 5. The benefit of utilizing discrete bonding features 510 over a continuous bonding feature is that the discrete bonding features reduce line contact features to point contacts. This localizes stresses that are capable of piercing insulating layers on the mating surface. Although the bonding features are illustrated as placed on the bottom rail section 506, they could alternately or additionally be placed on the solar module frame 504 and/or top rail section 505.

One or more embodiments provide that alternative forms of rail enhancement are used to provide integrated bonding features. In one implementation, the surfaces of the top and bottom rail sections 105, 106 (FIG. 1A) may be pierced using dies to create a sharp protrusion on, for example, the ledge surface 124 (FIG. 1A). Under one implementation, die work is performed on the ledge surface 124 to create sharp louvers analogous to the features 205 of bonding clip 210 (see FIG. 2A). In another implementation, a drilling procedure may lift material out of the hole to create a sharp raised collar, such as can be achieved through thermal drilling and other collaring equipment.

Figure 6:
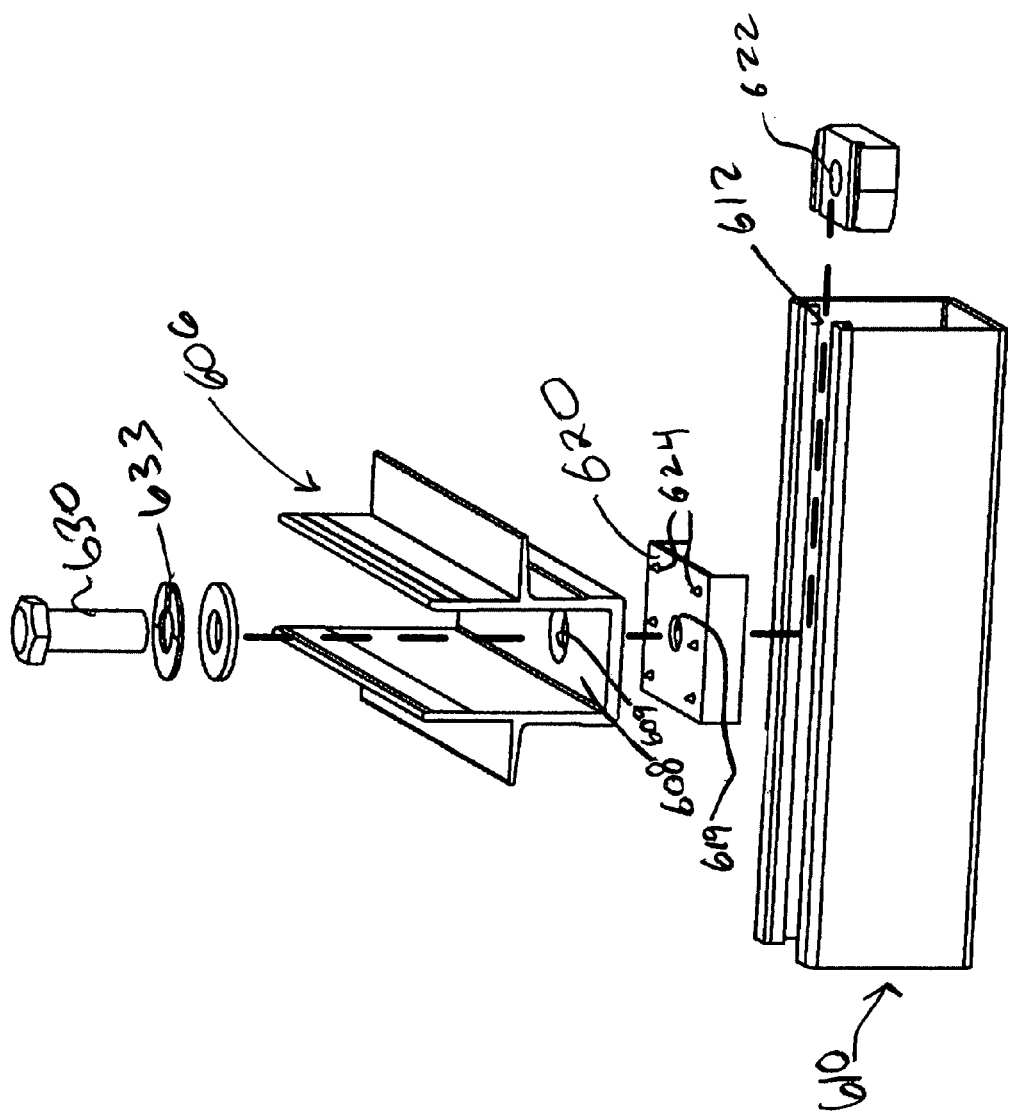
FIG. 6 is an exploded view of a mounting assembly that includes a strut runner, under an embodiment of the invention.

FIG. 6 is an exploded view of a mounting assembly that includes a strut runner, under an embodiment of the invention. A lower rail section 606 of a rail assembly (not shown) may include a base surface 608 that secures to a strut runner 610. The bolt 630 may extend through an opening 609 of the base surface 608, so as to be received by structures that engage the strut runner 610.

The lower rail section 606 (and this rail assembly) may extend in an orthogonal direction as compared to the direction of the strut runner 610. The strut runner 610 may include a slot 612 that receives an attachment bolt 630, extending from the bottom rail section 606. In one implementation, the attachment bolt 630 is separate from a compression bolt or mechanism used with the rail assembly. The bolt 630 may be received by a washer mechanism 620, which engages slot 612, to enable the bottom rail section 606 to secure to the strut runner 610. The slot 612 may also hold a strut nut 622 for receiving and retaining the bolt 630. The bottom rail section 606 is then secured to the strut runner 610 through a tightening of the bolt 630 and strut nut 622.

The strut runner 610 may secure to the underlying structure so as to retain the rail assembly in place. Multiple strut runners may be used in one mounting assembly to hold multiple rail assemblies in position. The resulting assembly may retain solar modules in series and/or in parallel, and/or in column and row-wise alignment.

Electrical bonding may be enhanced between the bottom rail section 606 and strut runner 610 through the use of washer mechanism 620. The washer mechanism 620 may incorporate a hole 619 for passage of the bolt 630. The washer mechanism 620 may additionally contain sharp protrusions 624 designed to promote electrical contact between the strut runner 610 and bottom rail section 606 when compression is present from bolt 630 and strut nut 622. As such, protrusions 624 may be provided on both the top and bottom surface of the washer mechanism 620 (bottom surface not shown).

Alternately, proper electrical bonding between the bottom rail section 606 and strut runner 610 may be achieved without the bonding washer mechanism 620. As an alternate method, the washer 633 may take the form of a serrated or toothed washer capable of bonding the bottom rail section 606 to bolt 630. The bolt 630 may maintain electrical contact to strut nut 622 through the threaded interface, and the strut nut 622 may be bonded to the strut runner 610 through protrusions that engage the strut runner 610 during compression.

While a strut runner 610 has been used to describe the structural and electrical attachment of the bottom rail section 606, alternate implementations and designs may use other members that are capable of achieving the same or similar effect. As examples, structural channel, beams, bar, or other members may be used with appropriate fasteners. As such, the strut runner 610 should simply be viewed as an illustrative embodiment for securing a rail assembly or a section thereof.

Figure 7:
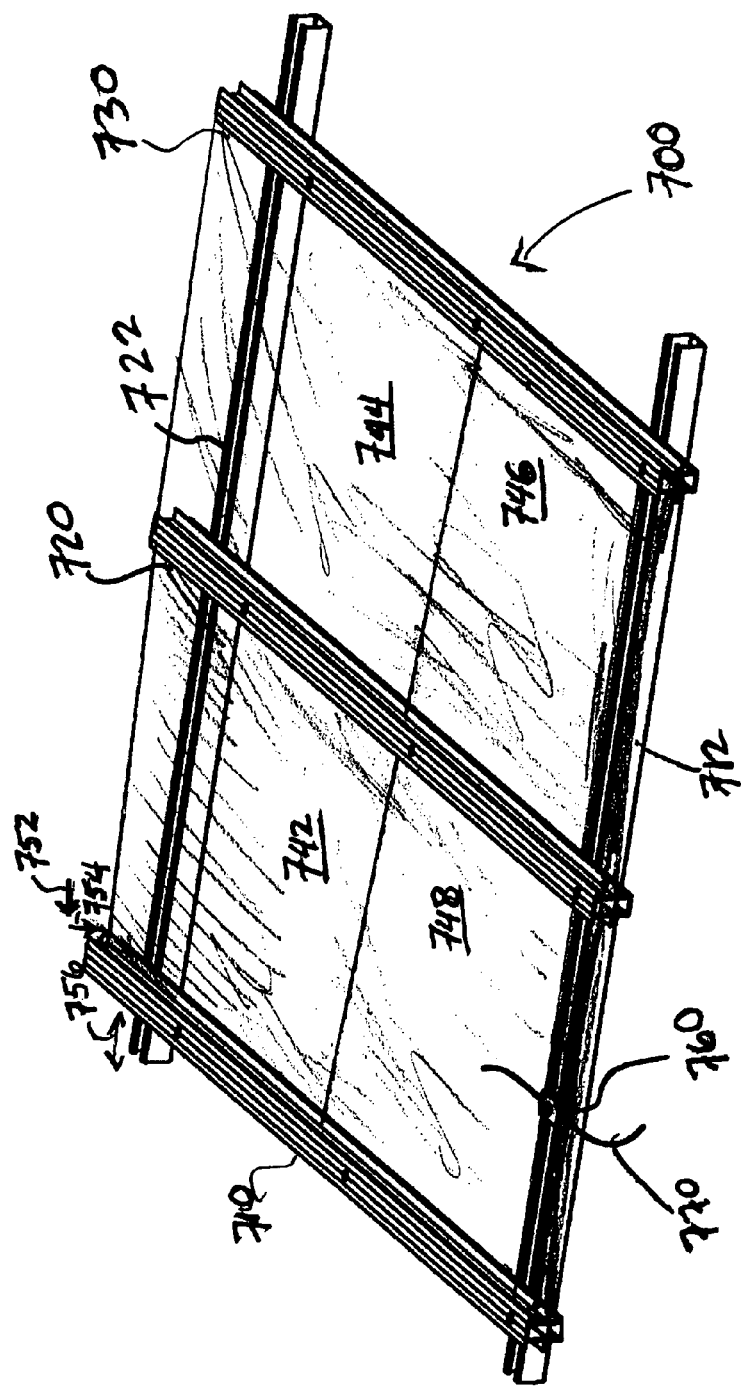
FIG. 7 illustrates a mounting assembly, under an embodiment of the invention.

FIG. 7 illustrates a mounting assembly 700 comprising a set of strut runners 712, 722 and a set of mounting rails, under an embodiment of the invention. In FIG. 7, rail assemblies are assumed to have a construction such as described with, for example, an embodiment of FIG. 1A. Mounting rail assemblies 710, 720, and 730 include both top and bottom rail sections. The mounting assembly 700 holds multiple solar panels 742, 744, 746, 748. As mentioned elsewhere, the solar panels may individually comprise only one element of a solar module that has both panel and frame. For simplicity, only the panels of the solar modules are shown in FIG. 7.

With regards to FIGS. 1 and 7, to properly retain the frames that directly support the solar panels 742, 744, 746, 748, the mounting rail assemblies 710, 720, 730 may be secured at fixed distances from each other to provide for the width of the solar panels 742, 744, 746, 748 and their associated frames 104 (FIG. 1A), such that they may be compressed and retained on a common edge. Strut runners 712, 722 provide such a fixed spacing within the mounting system when the lower rail sections are secured to the strut runners, as illustrated by FIG. 6. Numerous variations are possible to the mounting assembly 700. For example, although the strut runners 712, 722 are shown as continuous members, they may be deployed as shorter discrete sections secured to an underlying surface such as a roof.

In addition to achieving a fixed spacing and physical arrangement of the rail assemblies 710, 720, 730 the strut runners 712, 722 may also provide electrical bonding between adjacent rail assemblies within the mounting system. Assuming the strut runners are fabricated from a metal or other electrically conductive material then the electrical bond between each rail set 710, 720, 730 and the corresponding strut runner 712, 722 is communicated to the other rail assemblies utilizing the strut runner as the common conductor or buss bar. Thus, for example, the set provided by panels 742 and 748 may be connected as columns, as well as the set provided by panels 744 and 746. As provided with numerous embodiments described herein, conductive elements 102 (FIG. 1A) may conduct electrical current from the frame (not shown in FIG. 7) of the solar module to the attached rail assembly 710, 720, 730. Directional arrow 752 illustrates such a conductive path, which can occur at discrete locations on the mounting assembly 700, coinciding with placement of conductive elements, as described with any of the embodiments provided for herein. Under an embodiment such as described with FIG. 6, the conductive path between one of the rail assemblies 720, 720, 730 is further extended to the connected strut runner 712, 722. Directional arrow 754 illustrates such a conductive path, which enables the rail assemblies to use the strut runners 712, 722 as buss bars. The strut runners 712, 722 may ground or direct the current away from the mounting assembly, as illustrated by the directional arrow 756. As such, conductive paths may be defined by the directional arrows 752, 754 and/or 756.

As an alternative or addition, one or more embodiments provide the solar module assembly as a whole may be discontinuous, or assembled in discrete sections. Furthermore, the strut runners and the rail assemblies may be electrically discontinuous. In such cases, electrical continuity for bonding may be achieved by, for example, extending a wire or other conductor between discrete strut runners or between discrete sections of the assembly as a whole. Alternatively, the same effect may be achieved if solar modules at each discrete section are bonded to each rail assembly on each of their respective edge section. The bonding between one solar module and both rail assemblies of that solar module may provide the electrical continuity that may otherwise be absent amongst the discrete sections.

Because of the ability of the rail assemblies 710, 720, 730 and strut runners 712, 722 to serve as electrical buss bars, a common bonding point 760 may be used to bond (or ground) the entire mounting system 700, inclusive of strut runners, mounting rail sets, ancillary hardware, and solar modules through a conductor 770 to a designated point such as a grounding rod or other location. Thus, for example, conductive paths illustrated by the directional arrows 752 (frame to rail assembly), 754 (rail assembly to strut runner) and 756 (along strut runner) may carry to the conductor 770 via the point 760. As such, bonding point 760 may be used to commonly bond all elements within a solar array including the mounting system and solar modules.

To further illustrate how a single bonding point 760 may be used to commonly bond the entire solar array, the current paths may be traced through the system with reference to FIG. 1A and FIG. 7. Beginning at bonding point 760 which bonds conductor 770 to strut runner 712, the bottom rail section 106 (FIG. 1A) of each rail assembly 710, 720, 730 may be bonded to strut runner 712. An embodiment such as described with FIG. 6 may be used to bond the strut runner 712 to the rail assemblies. Each of the bottom rail sections 106 may be bonded to the corresponding top rail sections 105 through compression bolts 130 and receiving structures 132. Furthermore, each solar module 101 may be bonded to one or more rail assemblies through any of the embodiments described above. The solar module frame 104 (FIG. 1A) may be electrically bonded to a single rail assembly when it is in physical contact with two since one or more of the underlying strut runners 712, 722 are capable of bonding adjacent rail assemblies. Thus, for example, solar modules placed in column alignment (as shown by panels 742 and 748) may be bonded together by the rail assemblies, while solar modules aligned in rows (as shown by panels 742 and 744) may be bonded by the strut runners 712, 722. Because of the multiple and redundant bonding points and therefore current paths provided within the mounting system and afforded by the capacity of rail assemblies and strut runners to act as buss bars, a single bonding point 760 is sufficient to bond all elements within the assembly 700. If desired and for sake of redundancy, a second bonding point (in addition to bonding point 760) may be established on strut runner 712, or any conductive element within the array.

Although the descriptions above contain many specifics, these should not be construed as limiting the scope of the invention but as merely providing illustrations of some embodiments.

What is claimed is:

1. A rail assembly for a mounting system that supports an array of solar modules, the rail assembly comprising:
   a top section;
   a bottom section that is combinable with the top section to extend lengthwise in a first direction, a portion of the top rail section being compressed into the bottom rail section;
   wherein at least one of the top section and the bottom section are structured so that a receiving structure is provided for horizontally receiving an edge section of a frame of a solar module in an operative position;
   a compression mechanism that is usable to create a compression force that compresses the top section and the bottom section into retaining and supporting the edge section of the frame of the solar modules in an operable position within the receiving structure; and
   a conductive element extending along one of the top section and bottom section, the conductive element including a segment that is provided between the top section and bottom section, the segment including one or more pointed protrusions that extend and make contact with at least one of the top section and bottom section, wherein the one or more protrusions are positioned to be effected by the compression force of the compression mechanism in forming an electrical bond with the edge section of the frame of the solar module and enabling a conductive path for electrical current.

2. The rail assembly of claim 1, wherein the conductive element includes at least a thickness that extends between a surface of the receiving structure and the frame of the solar module, and wherein the thickness of the conductive element on the receiving structure is shaped to include a peak and a trough.

3. The rail assembly of claim 1, wherein the surface of the receiving structure corresponds to a ledge, and wherein the conductive element is unitarily formed with at least a portion of the ledge.

4. The assembly of claim 1 wherein the segment comprises conductive studs, and wherein the segment is provided on a separate polymer strip.

5. The rail assembly of claim 1, wherein the compression force of the compression member actively bonds the one or more protrusions to at least one of the solar modules.

* * * * *